United States Patent
Gerligand et al.

(10) Patent No.: US 11,029,537 B2
(45) Date of Patent: Jun. 8, 2021

(54) SOFT CONTACT LENS WITH NEW STABILIZATION ZONES FOR IMPROVED ANGULAR STABILITY AND COMFORT

(71) Applicant: Johnson & Johnson Vision Care, Inc., Jacksonville, FL (US)

(72) Inventors: Pierre-Yves Gerligand, St. Johns, FL (US); Philippe F. Jubin, Fernandina Beach, FL (US); Gary Richardson, Jacksonville, FL (US)

(73) Assignee: Johnson & Johnson Vision Care, Inc, Jacksonville, FL (US)

( * ) Notice: Subject to any disclaimer, the term of this patent is extended or adjusted under 35 U.S.C. 154(b) by 119 days.

(21) Appl. No.: 16/411,406

(22) Filed: May 14, 2019

(65) Prior Publication Data
US 2020/0363655 A1 Nov. 19, 2020

(51) Int. Cl.
*G02C 7/04* (2006.01)

(52) U.S. Cl.
CPC .................................... *G02C 7/048* (2013.01)

(58) Field of Classification Search
CPC ....................................................... G02C 7/048
USPC ....................................................... 351/159.36
See application file for complete search history.

(56) References Cited

U.S. PATENT DOCUMENTS

| | | | |
|---|---|---|---|
| 5,760,870 A | 6/1998 | Payor et al. | |
| 8,403,479 B2 | 3/2013 | Potze et al. | |
| 2004/0156013 A1* | 8/2004 | Lindacher | G02C 7/048 351/159.41 |
| 2005/0068489 A1* | 3/2005 | Hall | G02C 7/044 351/159.1 |
| 2005/0237482 A1 | 10/2005 | Jubin et al. | |
| 2006/0055884 A1* | 3/2006 | Molinari | G02C 7/048 351/159.74 |
| 2006/0244903 A1* | 11/2006 | Ye | G02C 7/04 351/159.21 |
| 2009/0225273 A1* | 9/2009 | Clutterbuck | G02C 7/04 351/159.02 |
| 2012/0075579 A1* | 3/2012 | Roffman et al. | G02C 7/041 |
| 2012/0075580 A1* | 3/2012 | Roffman et al. | G02C 7/041 |
| 2012/0075581 A1* | 3/2012 | Roffman et al. | G02C 7/043 |
| 2012/0242950 A1* | 9/2012 | Roffman et al. | G02C 7/043 351/159.19 |
| 2012/0242951 A1* | 9/2012 | Roffman | G02C 7/043 351/159.19 |
| 2013/0077045 A1* | 3/2013 | Gerligand | G02C 7/048 351/159.74 |
| 2013/0258274 A1* | 10/2013 | Wildsmith | G02C 7/048 351/159.1 |
| 2014/0063445 A1* | 3/2014 | Caldarise | G02C 7/049 351/159.05 |
| 2015/0343514 A1 | 12/2015 | Inoue et al. | |
| 2015/0370090 A1 | 12/2015 | Ehrmann et al. | |
| 2016/0357030 A1* | 12/2016 | Gerligand | G02C 7/049 |

(Continued)

*Primary Examiner* — James R Greece

(57) ABSTRACT

Ophthalmic lenses are described herein. An example ophthalmic lens may comprise a first surface. The example ophthalmic lens may comprise a second surface disposed opposite the first surface. The second surface may be configured to abut at least a portion of an eye of a wearer. The example ophthalmic lens may comprise a lens stabilization zone disposed adjacent the first surface. At least a contour of the lens stabilization zone may be configured to minimize a recovery time for the ophthalmic lens to orient to a resting position from a misaligned position.

2 Claims, 11 Drawing Sheets

(56) References Cited

U.S. PATENT DOCUMENTS

| | | |
|---|---|---|
| 2017/0059882 A1 | 3/2017 | Gerligand et al. |
| 2017/0139231 A1* | 5/2017 | Gerligand .............. G02C 7/028 |
| 2018/0015678 A1* | 1/2018 | Damodharan ... B29D 11/00836 |
| 2018/0180902 A1 | 6/2018 | Franklin et al. |
| 2019/0384072 A1* | 12/2019 | Richardson ............ G02C 7/047 |

* cited by examiner

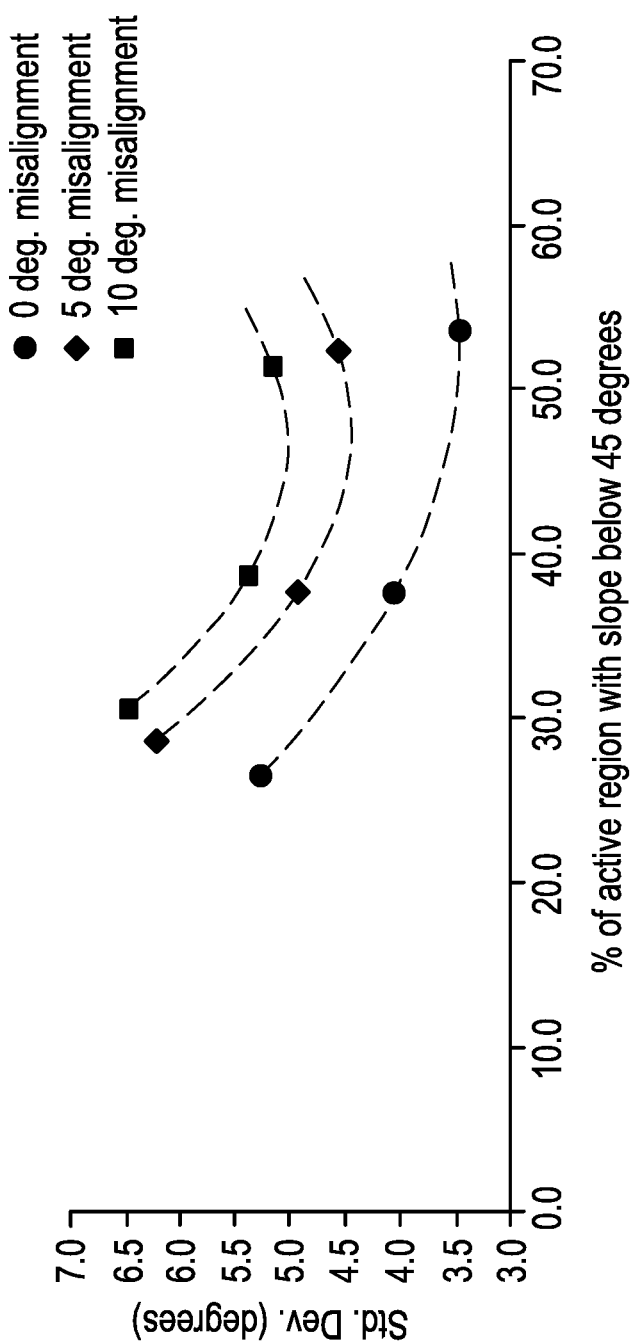

SOFT CONTACT LENS WITH NEW STABILIZATION ZONES FOR IMPROVED ANGULAR STABILITY AND COMFORT

BACKGROUND

Mechanical aspects related to an angular position of a soft toric contact lens may be useful for vision performance. A first mechanical aspect may comprise the speed at which a contact lens returns to a final angular position. An angular misalignment may occur during an initial lens insertion or from a mechanical intervention, such as rubbing an eye or intensive blinking (induced by the presence of foreign matter, for example). The faster a lens reaches a final resting position, the faster a wearer (e.g., user, etc.) wearing the lens may receive vision correction.

A second mechanical aspect may comprise the ability of a contact lens to maintain a same angular position on an eye. Similar lenses prescribed to multiple wearers may preferably rest angularly in a same position on each wearer's eye, which may reduce occurrences of selecting a next available cylinder axis by maintaining a lens angular position proximate to a horizontal axis. The horizontal axis may be used as a reference for the cylinder axis. The tighter a distribution of a resting angular position of a lens, the more stable the lens may be angularly. Providing a tighter distribution of the resting angular position of the lens, may provide less vision fluctuation, especially for wearers requiring large astigmatism correction.

Stability may also be useful for wearers requiring vision corrections that are more complex than astigmatism, such as high order aberration corrections. Keratoconus condition is a good example of an eye disease that may benefit from such a design, if a vision deficiency related to the condition is corrected with the use of contact lenses.

Improvements are needed.

SUMMARY

Ophthalmic lenses are described herein. An exemplary ophthalmic lens may comprise a first surface. The exemplary ophthalmic lens may comprise a second surface disposed opposite the first surface. The second surface may be configured to abut at least a portion of an eye of a wearer. The exemplary ophthalmic lens may comprise a lens stabilization zone disposed adjacent the first surface. At least a contour of the lens stabilization zone may be configured to minimize a recovery time for the ophthalmic lens to orient to a resting position from a misaligned position.

Another exemplary ophthalmic lens may comprise a first surface. The exemplary ophthalmic lens may comprise a second surface disposed opposite the first surface. The second surface may be configured to abut at least a portion of an eye of a wearer. The exemplary ophthalmic lens may comprise an active region disposed adjacent the first surface. At least a contour of the active region may be configured based on a distribution of terrain slope of a target one or more eyes.

BRIEF DESCRIPTION OF THE DRAWINGS

The following drawings show generally, by way of example, but not by way of limitation, various examples discussed in the present disclosure. In the drawings:

FIG. 12 illustrates a standard deviations of Lenses #1, #2, and #3 for varying lens misalignments ranging from 0 degree to 10 degrees in the nasal direction versus the cumulated distribution of the terrain slope below 45 degrees in the active region.

DETAILED DESCRIPTION

Figure 1:
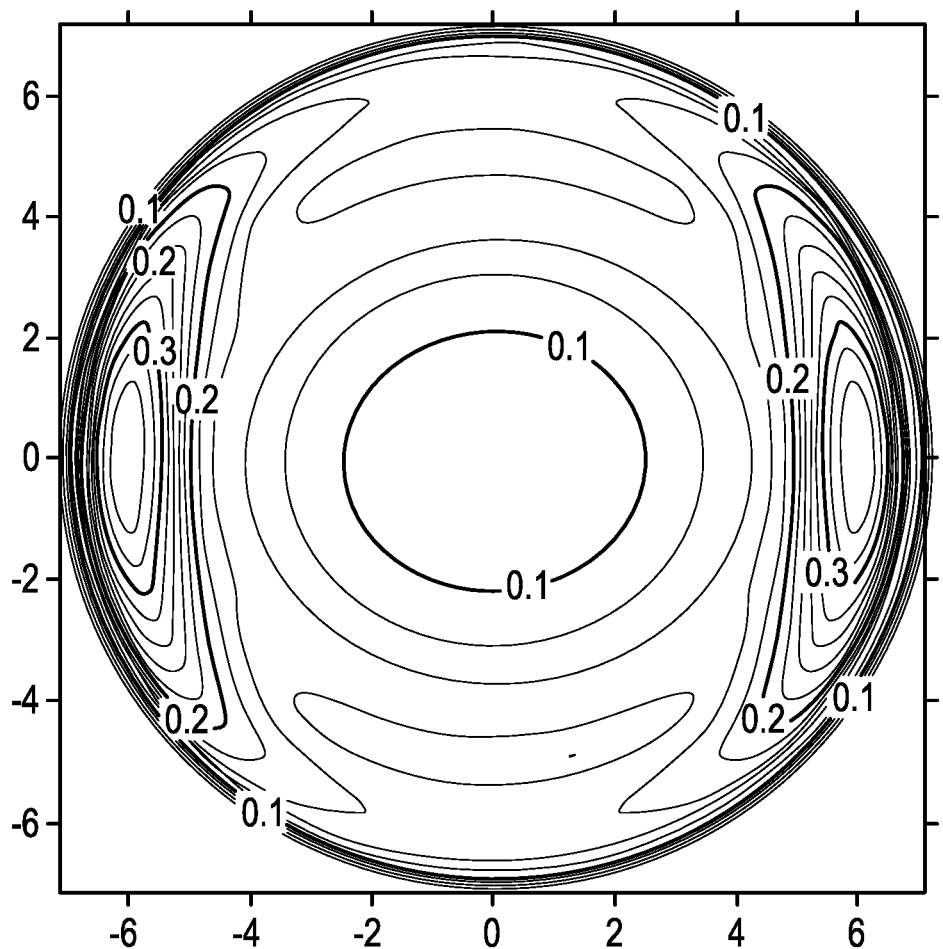
FIG. 1 illustrates a radial thickness contour plot of an example soft contact lens.

A contact lens described herein may comprise one or more stabilization zones. The stabilization zones may be contoured in such a manner that pressure from an eyelid may secure the contact lens to a location relative to a pupil of an eye. A first contoured area may be to the left of the pupil of the eye. A second contoured area may be to the right of the pupil of the eye. A contoured area may comprise an outer perimeter and an inner perimeter. Moving from the outer perimeter towards the inner perimeter, a contoured area may generally increase in thickness. Having a contoured area with generally increasing thickness to the left and the right of the pupil of the eye may allow pressure from an eyelid to stabilize the contact lens relative to the pupil at a horizontal location of the first contoured area similar to a horizontal location of the second contoured area.

An ophthalmic lens may comprise a first surface. The ophthalmic lens may have a generally round shape. The ophthalmic lens may also have a non-round shape.

The ophthalmic lens may comprise a second surface disposed opposite the first surface. The second surface may be configured to abut at least a portion of an eye of a wearer.

The ophthalmic lens may comprise a lens stabilization zone disposed adjacent the first surface. At least a contour of the lens stabilization zone may be configured to minimize a recovery time for the ophthalmic lens to orient to a resting position from a misaligned position.

The ophthalmic lens may comprise a second lens stabilization zone disposed adjacent the first surface. At least a contour of the second lens stabilization zone may be configured to minimize a recovery time for the ophthalmic lens to orient to a resting position from a misaligned position due to interaction with at least one eyelid of the wearer. The lens stabilization zones may be symmetrical with respect to the sagittal plane. The lens stabilization zones may be symmetrical with respect to the tangential plane. The lens stabilization zones may be symmetrical with respect to the sagittal plane and the tangential plane. The lens stabilization zones may not be symmetrical with respect to the sagittal plane. The lens stabilization zones may not be symmetrical with respect to the tangential plane. The lens stabilization zones may not be symmetrical with respect to the sagittal plane and the tangential plane.

The lens may comprise an area for a pupil. The first lens stabilization zone may be to the left of the area for the pupil when the lens is in a correct position. The second lens stabilization zone may be to the right of the area for the pupil when the lens is in the correct position. The lens stabilization zones may be an equal distance from the area for the pupil. The lens stabilization zones may not be an equal distance from the area for the pupil.

The lens stabilization zones may each comprise a respective outer parameter. The lens stabilization zones may each comprise a respective inner parameter. A first thickness may be associated with a respective outer parameter. A second thickness may be associated with a respective inner parameter. The lens stabilization zones may be contoured so as to smoothly and/or gradually transition from the first thickness to the second thickness. The first thickness, the second thickness, and/or the contoured area between the first thickness and the second thickness may be configured so that pressure from an eyelid causes the lens to achieve a correct position relative to the area for the pupil.

The lens stabilization zone may be disposed at least partially within an active region of the lens based on an expected interaction with the at least one eyelid of the wearer. The expected interaction with the at least one eyelid of the wearer may be based on an individual eye shape of a target wearer. The expected interaction with the at least one eyelid of the wearer may be based on a plurality of sample eyes. The expected interaction with the at least one eyelid of the wearer may be based on one or more eyelid profiles. The expected interaction with the at least one eyelid may comprise one or more blinks. The expected interaction with the at least one eyelid may comprise an open position. The expected interaction with the at least one eyelid may comprise a closed position. The expected interaction with the at least one eyelid may comprise a resting position.

The one or more eyelid profiles may comprise a Cartesian coordinate system by a second order polynomial of the form: $a0 + a1 \cdot x + a2 \cdot x^2$, where $a0$ represents the superior/inferior palpebral aperture (the distance between the pupil center to the edge of the upper/lower eyelid in primary gaze), $a1$ is the slope of the eyelid at the location of the superior/inferior palpebral aperture, $a2$ is the curvature at that same location, and $x$ is the distance along the horizontal direction of the Cartesian coordinate system with its origin at the center of the pupil.

The recovery time may be below 2 minutes for a misalignment of 45 degrees. The misaligned position may be greater than 5 degrees measured angularly from a horizontal axis. The misaligned position may be greater than 10 degrees measured angularly from a horizontal axis.

The ophthalmic lens may comprise one or more silicone hydrogels. The ophthalmic lens may comprise one or more traditional hydrogels.

A wearer of contact lenses may insert a contact lens into an eye of the wearer. The contact lens may comprise two contoured stabilization zones. The contact lens may initially be out of position relative to a pupil of the eye. The wearer may blink the eye, causing pressure from an eyelid to be placed on the contact lens. The pressure from the eyelid may cause the contact lens to achieve a correct position relative to the pupil.

An ophthalmic lens may comprise a first surface. The ophthalmic lens may have a generally round shape. The ophthalmic lens may also have a non-round shape.

The ophthalmic lens may comprise a second surface disposed opposite the first surface. The second surface may be configured to abut at least a portion of an eye of a wearer.

The ophthalmic lens may comprise an active region disposed adjacent the first surface. At least a contour of the active region may be configured based on a distribution of terrain slope of a target one or more eyes. The contour may comprise a cumulative terrain slope. The contour may be configured for interactions with only upper eyelids or only lower eyelids.

The ophthalmic lens may comprise a second active region disposed adjacent the first surface. At least a contour of the second active region may be configured based on a distribution of terrain slope of a target one or more eyes. The active regions may be symmetrical with respect to the sagittal plane. The active regions may be symmetrical with respect to the tangential plane. The active regions may be symmetrical with respect to the sagittal plane and the tangential plane. The active regions may not be symmetrical with respect to the sagittal plane. The active regions may not be symmetrical with respect to the tangential plane. The active regions may not be symmetrical with respect to the sagittal plane and the tangential plane.

The lens may comprise an area for a pupil. The first active region may be to the left of the area for the pupil when the lens is in a correct position. The second active region may be to the right of the area for the pupil when the lens is in the correct position. The active regions may be an equal distance from the area for the pupil. The active regions may not be an equal distance from the area for the pupil.

The active regions may each comprise a respective outer parameter. The active regions may each comprise a respective inner parameter. A first thickness may be associated with a respective outer parameter. A second thickness may be associated with a respective inner parameter. The active regions may be contoured so as to smoothly and/or gradually transition from the first thickness to the second thickness. The first thickness, the second thickness, and/or the contoured area between the first thickness and the second thickness may be configured so that pressure from an eyelid causes the lens to achieve a correct position relative to the area for the pupil.

The active region may be configured based on an expected interaction with the at least one eyelid of the wearer. The expected interaction with the at least one eyelid of the wearer may be based on an individual eye shape of a target wearer. The expected interaction with the at least one eyelid of the wearer may be based on a plurality of sample eyes. The expected interaction with the at least one eyelid of the wearer may be based on one or more eyelid profiles. The expected interaction with the at least one eyelid may comprise one or more blinks. The expected interaction with the at least one eyelid may comprise an open position. The expected interaction with the at least one eyelid may comprise a closed position. The expected interaction with the at least one eyelid may comprise a resting position.

The one or more eyelid profiles may comprise a Cartesian coordinate system by a second order polynomial of the form: a0+a1·x+a2·x2, where a0 represents the superior/inferior palpebral aperture (the distance between the pupil center to the edge of the upper/lower eyelid in primary gaze), a1 is the slope of the eyelid at the location of the superior/inferior palpebral aperture, a2 is the curvature at that same location, and x is the distance along the horizontal direction of the Cartesian coordinate system with its origin at the center of the pupil.

At least a contour of the active region may be configured to minimize a recovery time for the ophthalmic lens to orient to a resting position from a misaligned position. The recovery time may be below 2 minutes for a misalignment of 45 degrees. The misaligned position may be greater than 5 degrees measured angularly from a horizontal axis. The misaligned position may be greater than 10 degrees measured angularly from a horizontal axis.

The ophthalmic lens may comprise one or more silicone hydrogels. The ophthalmic lens may comprise one or more traditional hydrogels.

A wearer of contact lenses may insert a contact lens into an eye of the wearer. The contact lens may comprise two contoured active regions. The contact lens may initially be out of position relative to a pupil of the eye. The wearer may blink the eye, causing pressure from an eyelid to be placed on the contact lens. The pressure from the eyelid may cause the contact lens to achieve a correct position relative to the pupil.

FIG. 1 describes a standard dual stabilization zone system on an exemplary lens. FIG. 1 represents a contour plot of the radial thickness of a −3.00 D/−0.75 D @ 180 degrees Rx lens. The stabilization zones located in the outer region of the lens, also called peripheral region, present a larger thickness centered along the horizontal direction than the thickness in the vertical direction of the peripheral region. The geometry of the stabilization zones follows the outer contour of the lens.

Figure 2:
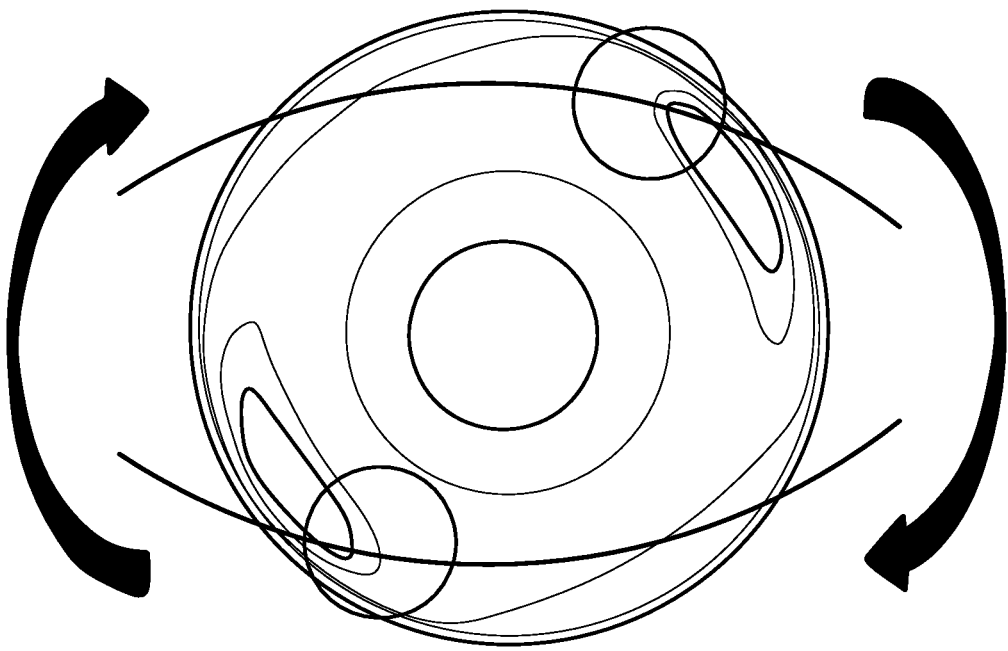
FIG. 2 illustrates an example of a misaligned toric contact lens. The solid black lines represent the upper and lower eyelid profiles of an arbitrary eye. The circles represent the active regions of the contact lens that drive the lens rotation.
Figure 3:
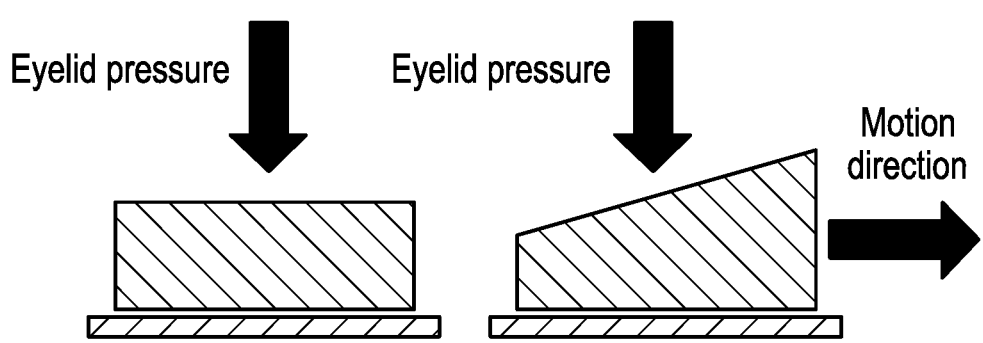
FIG. 3 illustrates a representation of the wedge effect. On the left section of the drawing is depicted the eyelid exerting pressure in a normal direction of the surface of the lens. As the pressure is perpendicular to the front surface of the lens no lateral motion is generated. On the right section of the drawing is depicted the eyelid exerting pressure in a direction different from the normal to the surface. The direction of the pressure generates a lateral motion in the active region providing the required torque that rotates the lens.
Figure 4:
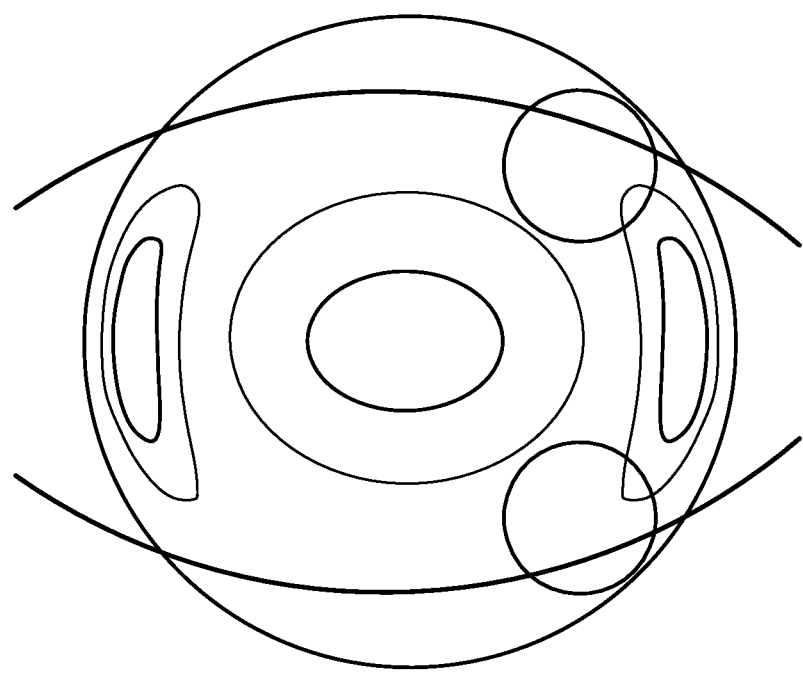
FIG. 4 illustrates an example of a toric contact lens in its resting position. The solid black lines represent the upper and lower eyelid profiles of an arbitrary eye. The circles represent the active regions of the contact lens that drive the lens stability in rotation.

The re-orientation and stability of such lens is driven from the pressure exerted by the upper and lower eyelids on the front surface of the lens. When the lens is angularly misaligned (FIG. 2), the eyelids will exert pressure on the lens in the active regions where large gradient thickness is present, acting as a wedge (FIG. 3), resulting in a torque that will rotate the lens in the clockwise direction as provided in the example. The region of the lens in contact with the eyelid that does not present large thickness gradient will not contribute to the lens rotation due to the lack of wedge effect. Once the lens reaches its final angular position (FIG. 4), all four active regions balance each other within an eyelid (temporal and nasal regions) and between eyelids (superior and inferior regions) resulting in maintaining the lens in its resting position.

Described herein is a new toric lens design where the angular stabilization is provided with a dual stabilization zone system (DSZS) where the active regions of the contact lens, when such lens reached its final angular resting position, have been optimized for angular stability.

An average eyelid profile was obtained from the measurement of multiple profiles collected on the right eye over a population of 100 subjects representing different ethnicities (Caucasian, East Asian, Indian/Middle Eastern). Each eyelid profile was described in a cartesian coordinate system by a second order polynomial of the form:

$$a0+a1 \cdot x+a2 \cdot x^2$$

Where a0 represents the superior/inferior palpebral aperture, the distance between the pupil center to the edge of the upper/lower eyelid in primary gaze, a1 is the slope of the eyelid at the location of the superior/inferior palpebral aperture and a2 is the curvature at that same location, and x is the distance along the horizontal direction of the cartesian coordinate system with its origin at the center of the pupil. Table 1 below provides the coefficients of the polynomials describing the average geometry of the upper and lower eyelid calculated over 100 subjects of different ethnicities.

TABLE 1

Average geometry of the upper and lower eyelid calculated over 100 subjects.

| Upper Eyelid | | | Lower Eyelid | | |
|---|---|---|---|---|---|
| a0 [mm] | a1 [mm] | a2 [mm] | a0 [mm] | a1 [mm] | a2 [mm] |
| 4.302 | 0.032 | −0.037 | −6.285 | 0.016 | 0.025 |

Figure 5:
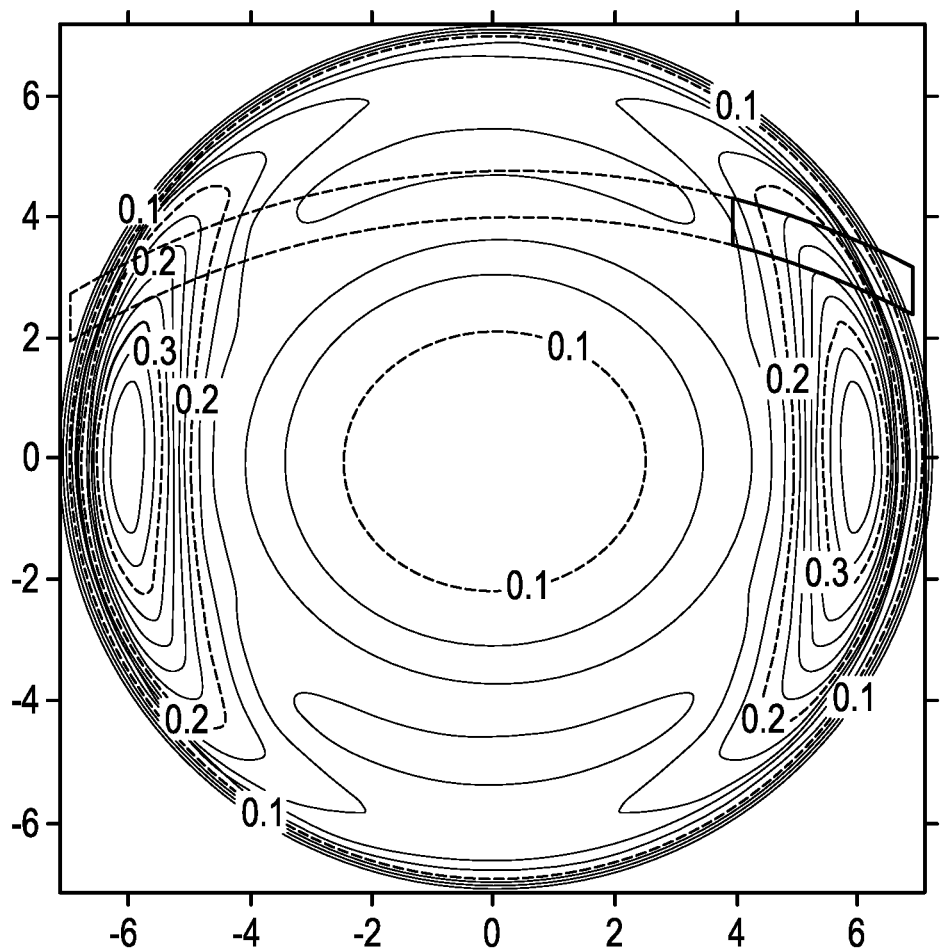
FIG. 5 illustrates a schematic representation of an average eyelid on a right eye and its pressure band interacting with a toric lens using DSZS approach for stability. The toric lens is represented by radial thickness contours. The grey box represents the active region that is the region of interest.

The region of interaction between the upper eyelid and the lens was defined as a band following the contour of the upper eyelid (FIG. 5). The band width below the upper eyelid contour was set to 0.25 mm and the band width above the eyelid contour was set to 0.50 mm providing a total band width of 0.75 mm representing the eyelid pressure band along with the eyelid is exerting pressure directly to the eye or to a contact lens when such lens is worn.

It should be obvious to the person who is familiar with such work that the average eye lid contour could be replaced by an individual contour or an average contour representative of a specific ethnicity. For example, the average contour could be representative of the Caucasian population or of the Asian population who have very distinctive eyelid geometries.

The lens rotation of toric lenses is mostly driven by the pressure exerted by the upper and lower eyelid and the motion of the upper eyelid during a blink cycle and more particularly the interaction of the upper eyelid with the stabilization zones of the soft contact lens. The active region (FIG. 5) is defined as the region of the upper eyelid interacting directly with the lens stabilization zone. In the provided examples, the start of the active region was defined at the horizontal coordinate of 4.00 mm. For horizontal coordinates below 4.00 mm the upper eyelid does not have any interaction with the lens stabilization zone. At this location the blending region connecting the outer edge of the optic zone to the inner region of the periphery may usually be found. It should be obvious to someone familiar with toric soft contact lenses that the starting point of the active zone should be adjusted according to the dimension of the soft contact lens and the location of the stabilization zone built into that contact lens.

In one aspect, the stabilization zone contours are modified such that the distribution of the slope within the active region interacting with the eyelid pressure band better matches that distribution calculated over a set of eyes when the orientation of the contact lens corresponds to its final resting position (lens aligned with the horizontal axis).

In another aspect, the stabilization zone contours are modified such that the distribution of the slope within the active region interacting with the eyelid pressure band better matches that distribution calculated over a set of eyes when the contact lens is misaligned by 10 degrees from its final resting position in a counter clockwise direction.

A better slope match means a more natural lens eyelid interaction in comparison with the eye eyelid interaction when no lens is present on the eye. This implies less eyelid deformation and thus a lens that is more comfortable to wear.

EXAMPLES

Figure 6:
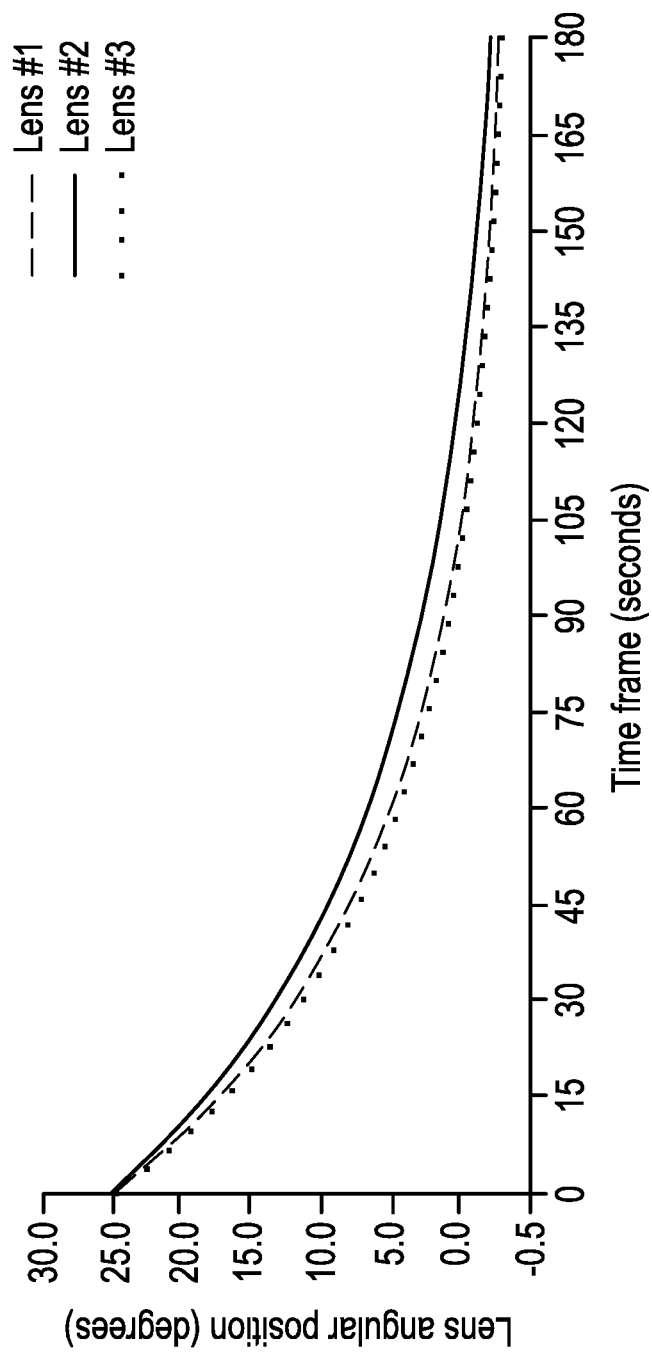
FIG. 6 illustrates average responses in rotation of three lenses, Lens #1, Lens #2 and Lens #3 calculated over a 3.0 min period (36 blinks each lasting 5 seconds). Each average response was calculated from a set of 16 individual responses.
Figure 7:
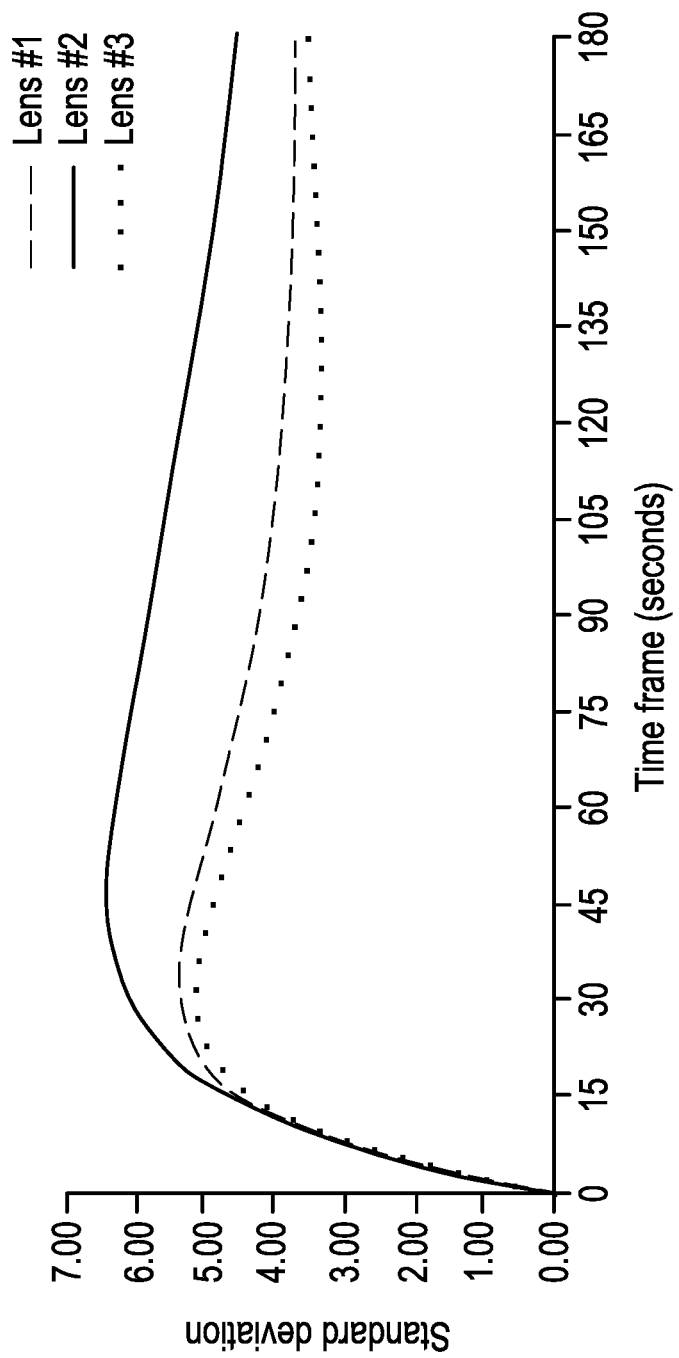
FIG. 7 illustrates standard deviations of the angular position of three lenses, Lens #1, Lens #2 and Lens #3 calculated over a 3.0 min period (36 blinks each lasting 5 seconds). Each standard deviation response was calculated from a set of 16 individual responses.

In a first example, a soft toric contact lens (Lens #1) is first evaluated for lens rotation and stability. The assessment was performed using a population of 16 eyes for which the eye topography and eyelid geometry were measured. The rotation and stability data were obtained using a rotation and centration simulation model (U.S. Pat. No. 8,403,479). A toric lens of Rx−3.00 D/−0.75 D@180 deg. was nasally misaligned by 25 degrees, the lens re-orientation was observed over 36 blinks cycles, each blink cycle lasting 5 seconds. The average lens rotation (FIG. 6) and standard deviation (FIG. 7) were calculated over the entire time frame.

In a second example a soft toric contact lens (Lens #2) of the same prescription of the Lens #1 was evaluated using the same conditions and eye population as of the lens of example 1. The average lens rotation (FIG. 6) and standard deviation (FIG. 7) were also calculated over the entire time frame.

In a third example a soft toric contact lens (Lens #3) of the same prescription of the Lens #1 was evaluated using the same conditions and eye population as of the lens of example 1. The average lens rotation (FIG. 6) and standard deviation (FIG. 7) were also calculated over the entire time frame.

Figure 8:
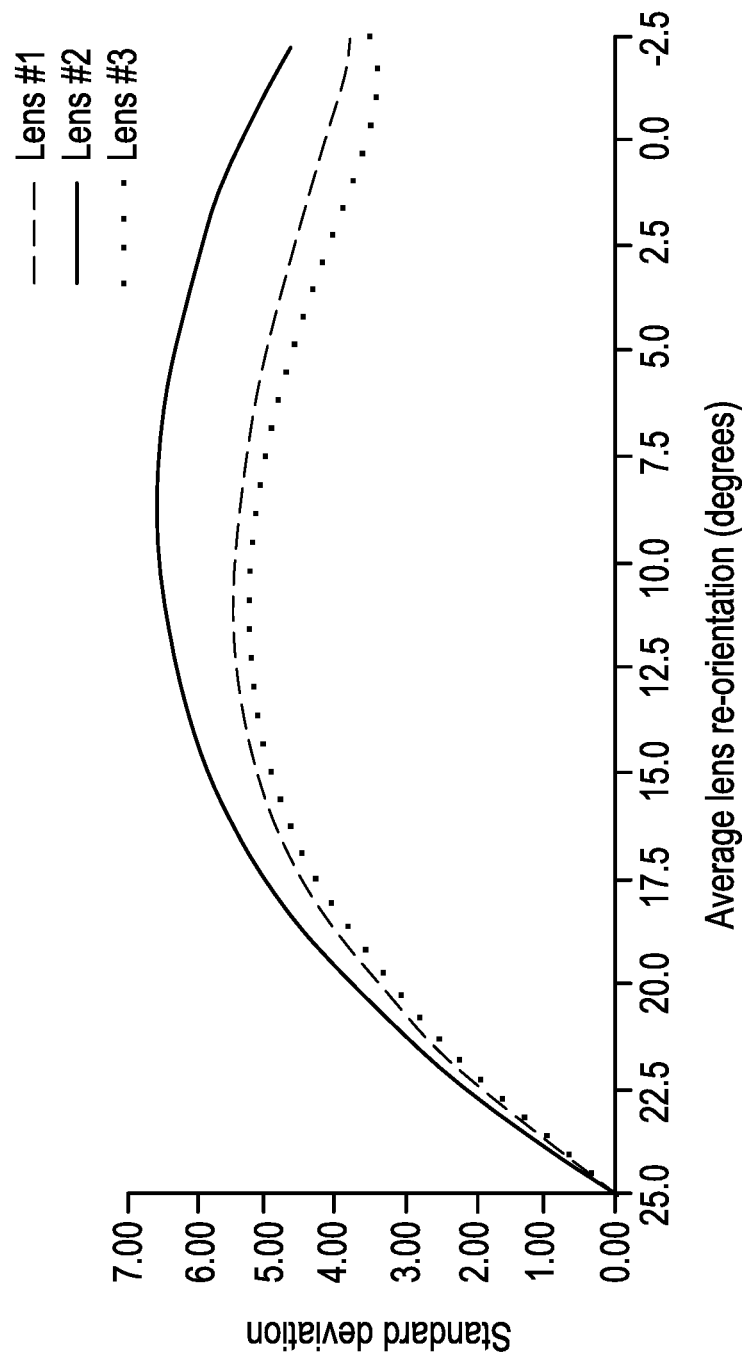
FIG. 8 illustrates the standard deviation obtained for Lenses #1, #2 and lens #3 plotted against the average lens angular position.

All three lenses present similar responses in lens re-orientation. All lenses converge to a final angular resting position close to the horizontal direction. To better compare those lenses to each other the standard deviation was plotted against the average lens angular position (FIG. 8). FIG. 8 thus provides the standard deviation of each lens for the same average angular position.

Lenses #2 and #3 were designed with the same base curve geometry, center thickness, maximum peripheral thickness located along the horizontal meridian, and same minimum peripheral thickness located along the vertical meridian as Lens #1. The only geometry influencing the rotation and stability performance is the front surface geometry of the stabilization zone located in the peripheral region.

Figure 9:
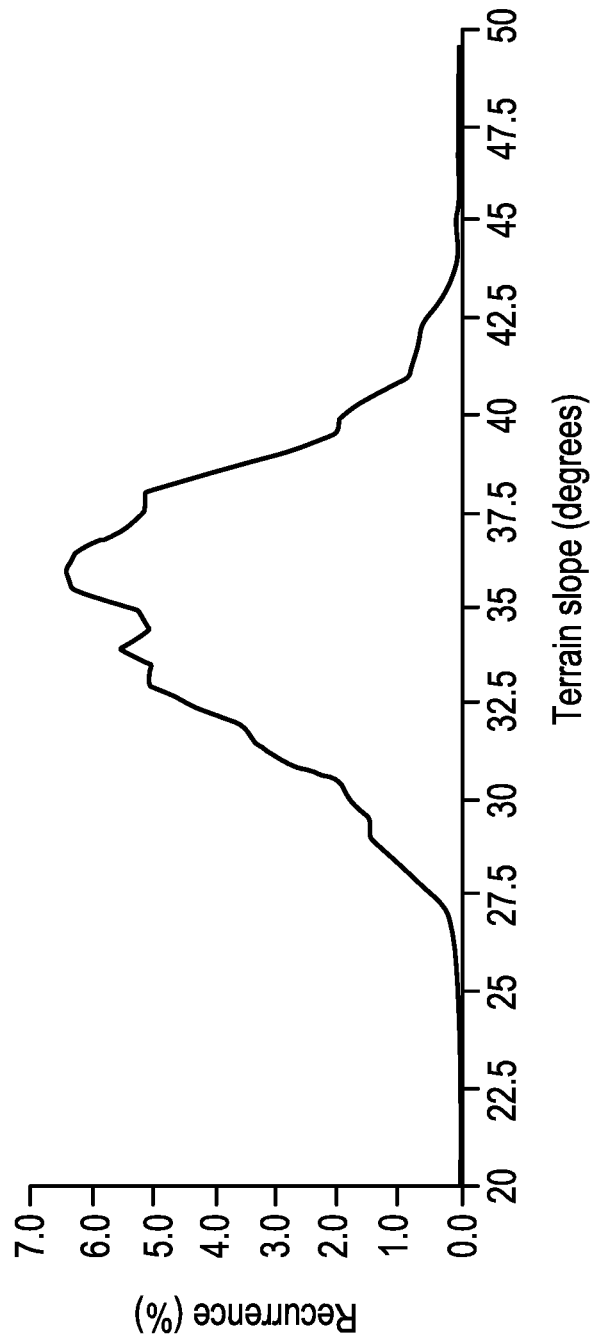
FIG. 9 illustrates a cumulated histogram of the terrain slope, calculated over the active region, for a set of 100 human eyes.

FIG. 9 is the cumulated histogram of the terrain slope calculated over a set of 100 eyes in the active region. Those eyes are a mix of Caucasian eyes, East Asian eyes and Indian/Middle Eastern eyes. The terrain slope is defined as the steepest slope calculated at a single location. The slope ranges from about 25 degrees to 45 degrees.

Figure 10:
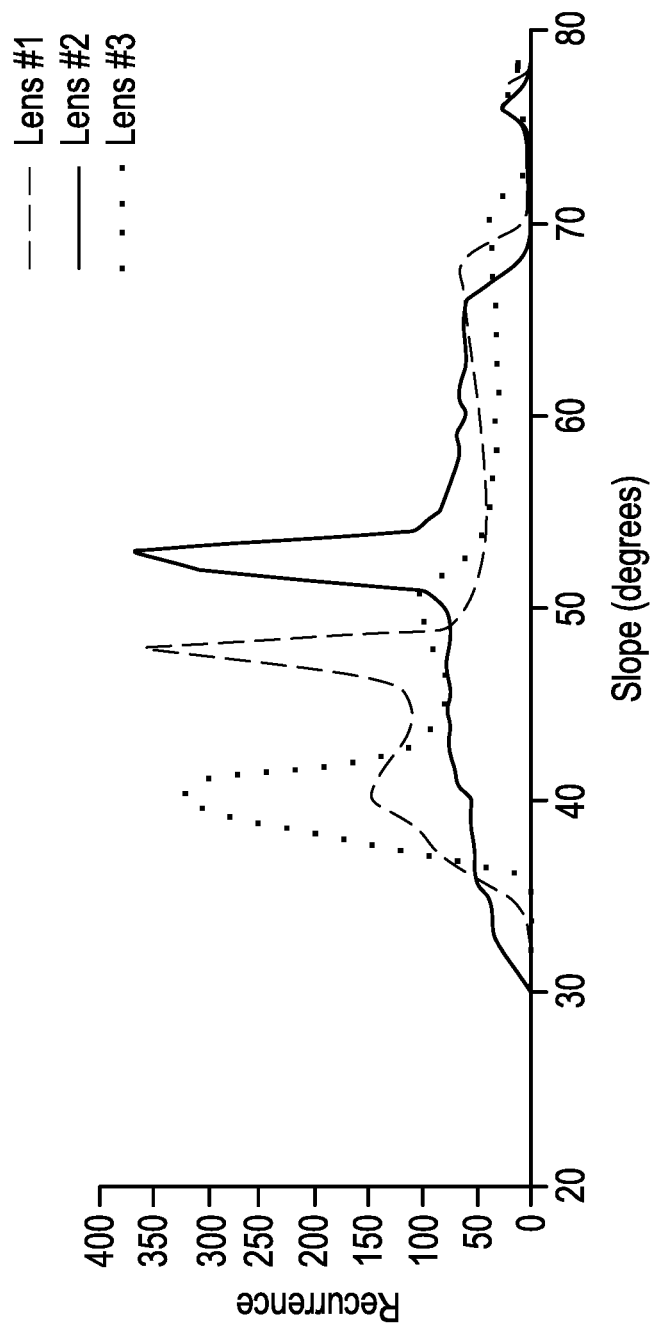
FIG. 10 illustrates a histogram of the terrain slope, calculated over the active region, of the front surface of the Lenses #1, #2 and #3 when each lens is perfectly aligned with the horizontal axis.
Figure 11:
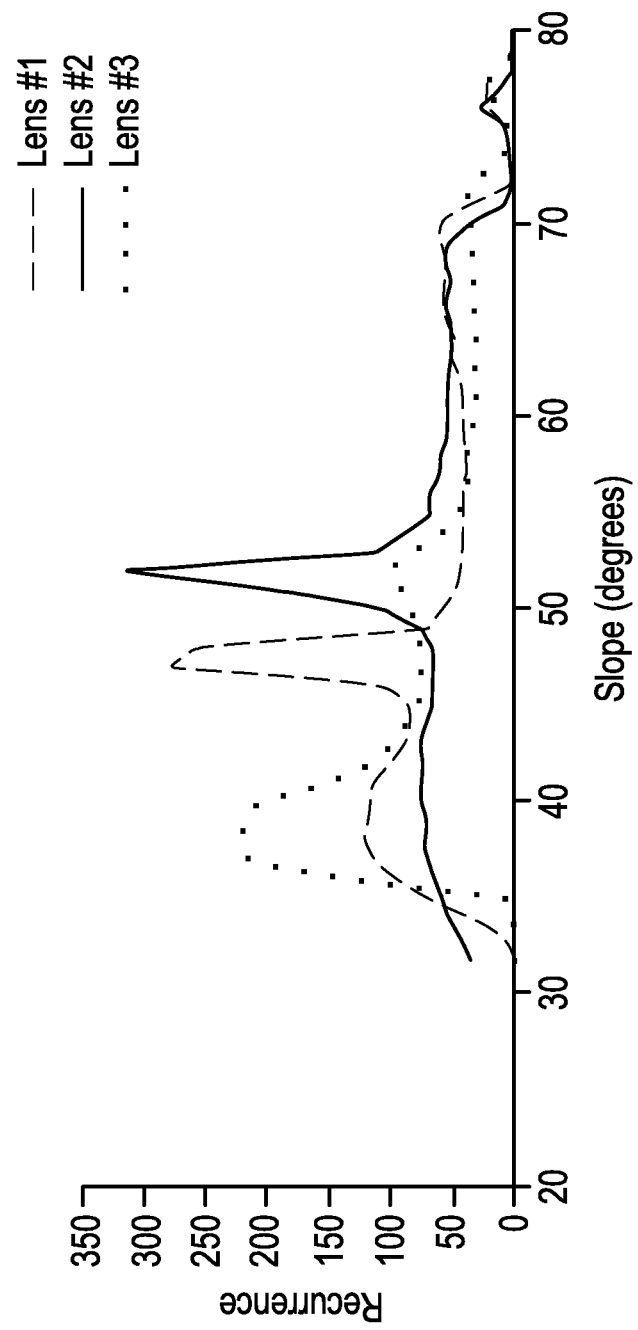
FIG. 11 illustrates a histogram of the terrain slope, calculated over the active region, of the front surface of the lenses #1, #2 and #3 when each lens is misaligned by 10 degrees in the nasal direction.

FIG. 10 displays the terrain slope in the same active region of the front surface of the Lenses #1, #2 and #3 when each lens is perfectly aligned with the horizontal axis that is the optimum angular position a contact lens can take when it reaches its resting position. FIG. 11 displays the terrain slope in the same active region of the front surface of the Lenses #1, # and #3 when each lens is misaligned by 10 degrees in the nasal direction. As the cylinder axis for toric lenses is usually provided every 10 degrees, toric lenses resting on the eye with a misalignment greater than 5 degrees from the required prescribed cylinder axis will usually be adjusted by selecting the next cylinder axis to reduce the axis error below 5 degrees. Thus, considering the case where the lens is misaligned by 10 degrees is very conservative as it should never occur with a lens correctly fitted on a patient.

In one aspect, the stabilization zones of the Lens #3 was designed such that the front surface in the active region better matches the cumulated terrain slope calculated for a set of 100 human eyes. Specifically, the cumulated distribution of the terrain slope below 45 degrees in the active region presents a higher percentage that of the cumulated distribution of the terrain slope of Lens #1 (Table 2 below). In other terms, the higher the cumulated distribution of the terrain slope below 45 degrees is, the larger the area matching the cornea slope is in the active region. In the second example, the stabilization zones of the Lens #2 was designed such that the front surface in the active region does not match the cumulated terrain slope and that the cumulated distribution of the terrain slope below 45 degrees in the active region presents a lower percentage that of the cumulated distribution of the terrain slope of Lens #1.

It should be obvious to someone familiar with toric soft contact lenses that the threshold angle might be changed based on the eye population the lens is designed for. In the proposed examples the threshold angle is based on a mix population of eyes. The threshold angle can also be ethnicity specific or other type of criterion if the toric soft contact lens is designed for a specific type of eyes.

TABLE 2

Cumulated distribution in percentage of the terrain slope below 45 degrees.

| | Lens misalignment | | |
|---|---|---|---|
| | 0 deg. | 5 deg. | 10 deg. |
| Lens #1 | 37.7 | 37.7 | 38.7 |
| Lens #2 | 26.5 | 28.6 | 30.6 |
| Lens #3 | 53.4 | 52.3 | 51.5 |

The average angular response obtained for Lens #3 over a 3.0 min period of lens re-orientation closely matches that of the Lens #1 with a better lens angular stability provided the standard deviation is smaller. The average angular response obtained for Lens #2 over a 3 min period of lens re-orientation still matches that of the Lens #1 but with a worse lens angular stability provided the standard deviation is larger.

FIG. 12 displays the standard deviation of each lens for varying lens misalignments ranging from 0 degree to 10 degrees in the nasal direction versus the cumulated distribution of the terrain slope below 45 degrees in the active region. FIG. 12. shows that a toric lens with a front surface terrain slope for which the cumulated distribution is larger than 38% will provide a better angular stability than toric lenses where the terrain slope cumulated distribution is below 38%. Preferably the cumulated distribution needs to be above 48%.

Although shown and described in what is believed to be the most practical and preferred embodiments, it is apparent that departures from specific designs and methods described and shown will suggest themselves to those skilled in the art and may be used without departing from the spirit and scope of the invention. The present invention is not restricted to the particular constructions described and illustrated but should be constructed to cohere with all modifications that may fall within the scope of the appended claims.

What is claimed is:

1. An ophthalmic lens comprising:
a first surface;
a second surface disposed opposite the first surface, wherein the second surface is configured to abut at least a portion of an eye of a wearer; and
a lens stabilization zone disposed adjacent the first surface, wherein at least a contour of the lens stabilization zone is configured to minimize a recovery time for the ophthalmic lens to orient to a resting position from a misaligned position,
wherein the lens stabilization zone is disposed at least partially within an active region of the lens based on an expected interaction with the at least one eyelid of the wearer, and wherein the one or more eyelid profiles comprise a Cartesian coordinate system by a second order polynomial of the form: $a0+a1 \cdot x+a2 \cdot x^2$, where a0 represents the superior/inferior palpebral aperture, the distance between the pupil center to the edge of the upper/lower eyelid in primary gaze, a1 is the slope of the eyelid at the location of the superior/inferior palpebral aperture and a2 is the curvature at that same location, and x is the distance along the horizontal direction of the Cartesian coordinate system with its origin at the center of the pupil.

2. An ophthalmic lens comprising:
a first surface;
a second surface disposed opposite the first surface, wherein the second surface is configured to abut at least a portion of an eye of a wearer; and
an active region disposed adjacent the first surface,
wherein at least a contour of the active region is configured based on a distribution of terrain slope of a target one or more eyes,
wherein the active region is configured based on an expected interaction with the at least one eyelid of the wearer,
wherein the expected interaction with the at least one eyelid of the wearer is based on one or more eyelid profiles, and
wherein the one or more eyelid profiles comprise a Cartesian coordinate system by a second order polynomial of the form: $a0+a1 \cdot x+a2 \cdot x^2$, where a0 represents the superior/inferior palpebral aperture, the distance between the pupil center to the edge of the upper/lower eyelid in primary gaze, a1 is the slope of the eyelid at the location of the superior/inferior palpebral aperture and a2 is the curvature at that same location, and x is the distance along the horizontal direction of the Cartesian coordinate system with its origin at the center of the pupil.

* * * * *